US011719831B2

(12) United States Patent
 Anderson et al.

(10) Patent No.: US 11,719,831 B2
(45) Date of Patent: Aug. 8, 2023

(54) SYSTEM AND METHOD FOR TRACKING AND FORECASTING THE POSITIONS OF MARINE VESSELS

(71) Applicant: MAEROSPACE CORPORATION, Waterloo (CA)

(72) Inventors: Ryan Anderson, Milverton (CA); Eric Meger, Waterloo (CA); Brian Franklin, Oakville (CA)

(73) Assignee: MAEROSPACE CORPORATION

( * ) Notice: Subject to any disclaimer, the term of this patent is extended or adjusted under 35 U.S.C. 154(b) by 231 days.

(21) Appl. No.: 17/083,723

(22) Filed: Oct. 29, 2020

(65) Prior Publication Data
US 2021/0109235 A1    Apr. 15, 2021

Related U.S. Application Data

(63) Continuation of application No. 15/121,500, filed as application No. PCT/CA2015/000120 on Feb. 25, 2015, now Pat. No. 10,830,907.
(Continued)

(51) Int. Cl.
| | |
|---|---|
| *G01S 19/48* | (2010.01) |
| *G01S 5/02* | (2010.01) |
| *G01C 21/20* | (2006.01) |
| *B63J 99/00* | (2009.01) |
| *G01C 21/14* | (2006.01) |

(Continued)

(52) U.S. Cl.
CPC .............. *G01S 19/48* (2013.01); *B63J 99/00* (2013.01); *G01C 21/14* (2013.01); *G01C 21/203* (2013.01); *G01S 5/0294* (2013.01); *G07C 5/008* (2013.01); *B63B 79/00* (2020.01)

(58) Field of Classification Search
CPC ........ G01C 21/203; G01C 21/14; B63J 99/00; G01S 5/0294; G01S 19/48; G07C 5/008; B63B 79/00
See application file for complete search history.

(56) References Cited

U.S. PATENT DOCUMENTS

| | | | | |
|---|---|---|---|---|
| 2,411,690 | A | * | 11/1946 | MacKay ................ G01C 21/20 33/457 |
| 2,717,448 | A | * | 9/1955 | Fonda ....................... G01S 7/12 33/457 |

(Continued)

*Primary Examiner* — Bhavesh V Amin
(74) *Attorney, Agent, or Firm* — Norton Rose Fulbright Canada LLP

(57) ABSTRACT

There is disclosed a system and method for forecasting the positions of marine vessels. In an aspect, the present system is adapted to execute a forecasting algorithm to forecast the positions of one or a great many marine vessel(s) based on one or more position reporting systems including coastal and satellite AIS (S-AIS) signals or LRIT received from the vessel. The forecasting algorithm utilizes location and direction information for the vessel, and estimates one or more possible positions based on previous paths taken by vessels from that location, and heading in substantially the same direction. Thus, a body of water can be divided into "bins" of location and direction information, and a spatial index can be built based on the previous paths taken by other vessels after passing through that bin. Other types of information may also be taken into account, such as ship-specific data, nearby weather, ocean currents, the time of year, and other spatial variables specific to that bin.

22 Claims, 5 Drawing Sheets

Related U.S. Application Data

(60) Provisional application No. 61/944,418, filed on Feb. 25, 2014.

(51) Int. Cl.
 *G07C 5/00* (2006.01)
 *B63B 79/00* (2020.01)

(56) References Cited

U.S. PATENT DOCUMENTS

| | | | | |
|---|---|---|---|---|
| 4,939,661 | A * | 7/1990 | Barker | G01C 21/22 |
| | | | | 701/493 |
| 9,865,167 | B1 * | 1/2018 | Liang | G08G 1/16 |
| 10,746,552 | B2 * | 8/2020 | Hashizume | B63B 49/00 |
| 11,091,237 | B2 * | 8/2021 | Kikuchi | B63B 49/00 |
| 2015/0042505 | A1 * | 2/2015 | Hope | G01S 13/937 |
| | | | | 342/41 |
| 2016/0167750 | A1 * | 6/2016 | Napolitano | B63B 49/00 |
| | | | | 701/454 |
| 2017/0192092 | A1 * | 7/2017 | Seifert | G01S 15/89 |
| 2018/0281907 | A1 * | 10/2018 | Hashizume | B63B 49/00 |
| 2018/0283874 | A1 * | 10/2018 | Hashizume | G09B 29/007 |

* cited by examiner

Easting

Message Time

Current Time Estimate

Two hours into future

SYSTEM AND METHOD FOR TRACKING AND FORECASTING THE POSITIONS OF MARINE VESSELS

CROSS REFERENCE TO RELATED APPLICATIONS

This application is a continuation of U.S. patent application Ser. No. 15/121,500 filed on Aug. 25, 2016, which is a national stage entry of PCT/CA2015/000120 filed on Feb. 25, 2015, which claims the benefit of U.S. Provisional Patent Application No. 61/944,418 filed on Feb. 25, 2014, all of which are herein incorporated by reference in their entirety.

FIELD OF THE INVENTION

The present invention relates generally to the tracking of marine vessels, and more particularly to a system and method for forecasting their positions at a point in time after their position is acquired.

BACKGROUND

Modern marine vessels including passenger ships and ships with gross tonnage exceeding 300GT that navigate open international waters are required to carry and operate an automatic transponder system known as the Automatic Identification System (AIS). AIS provides information such as the identification of the vessel, its speed, heading, and position at a given point in time as well as static information about the vessel and dynamic information about the current voyage.

Ships with AIS may exchange AIS data with other nearby ships to supplement marine radar as a means for collision avoidance. Ships with AIS may also be tracked by satellite-based AIS (S-AIS), and by AIS base stations located near shorelines (Coastal AIS or Terrestrial AIS) in order to allow various maritime and coastguard authorities to track marine vessel movements.

While S-AIS can detect vessel AIS data over a vast geographic area, the data is inherently delayed in its delivery to ground-based users due to several factors such as the location of earth stations to downlink the data, the specifics of satellite orbits and the time required to process and transport the data for users.

Most S-AIS tracking systems today will update the position, speed and direction of detected vessels at intervals of perhaps every 90 to 120 minutes on average, although particular vessels may be tracked more frequently by AIS base stations if the vessels are close enough to shore.

Furthermore, current S-AIS systems are generally only able to detect a certain percentage of vessels at each tracking interval. This is due to a number of reasons, notably the great distance between the vessel and the receiving satellite and the presence of signal interference created from observing thousands of vessels simultaneously from space.

S-AIS is the most commonly used global system for tracking vessels but other systems can also contribute similar position and vessel track data. All such systems produce data with varying degrees of delay and incompleteness similar to S-AIS. These systems are collectively position reporting systems. Different user groups may use one or more of these systems in an attempt to obtain the most complete maritime domain awareness.

For the foregoing reasons and others, at any given time, a significant percentage of vessels may be missing entirely, and an even larger proportion of position data may be out of date. Significant gaps between S-AIS measurements can result in loss of awareness of ship location, with no ability to track where they are or where they have headed.

Therefore, what is needed is an improved system and method for tracking and forecasting the position of marine vessels in order to provide a greater probability of locating a vessel which has not been detected for a significant period of time.

SUMMARY

The present disclosure relates to a system and method for forecasting the positions of marine vessels.

In an aspect, the present system is adapted to execute a forecasting algorithm to forecast the position of a marine vessel based on one or more position reports (such as from satellite AIS (S-20 AIS) signals received from the vessel or from some passive sensor (such as radar).

The forecasting algorithm utilizes location and direction information for the vessel, and estimates one or more possible headings based on previous paths taken by other vessels from that location, and heading in substantially the same direction. Thus, a body of water can be divided into "bins" of location and direction information, and a spatial index can be built based on the previous paths taken by other vessels after passing through that bin. Other types of information may also be taken into account, such as ship type, nearby weather, ocean currents, the time of year, and other spatial or state variables specific to that bin.

Advantageously, by building clean ship tracks and then re-indexing these tracks by position/heading bins rather than time (raw position reports) or MMSI (Maritime Mobile Service Identity—a station identification number used by AIS systems), the system can quickly build a probability cloud to represent the current and future position of any vessel from a recent S-AIS message. Such an estimate may also include a dead reckoning estimate for bins with no prior history.

In another aspect, the system is adapted to generate a dynamic probability cloud starting at the time of receipt of the reported position message, and which grows over time until the cloud gets too large to be useful. Advantageously, the probability cloud identifies one or more regions of probability in which a vessel is located. The probability cloud may be visualized using colors to indicate which areas in the cloud are most likely to include the vessel, thus adding valuable information to a predicted position display.

In this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The present invention will be better understood and objects of the invention will become apparent when consideration is given to the following detailed description thereof. Such description makes reference to the annexed drawings wherein.

Figure 1:
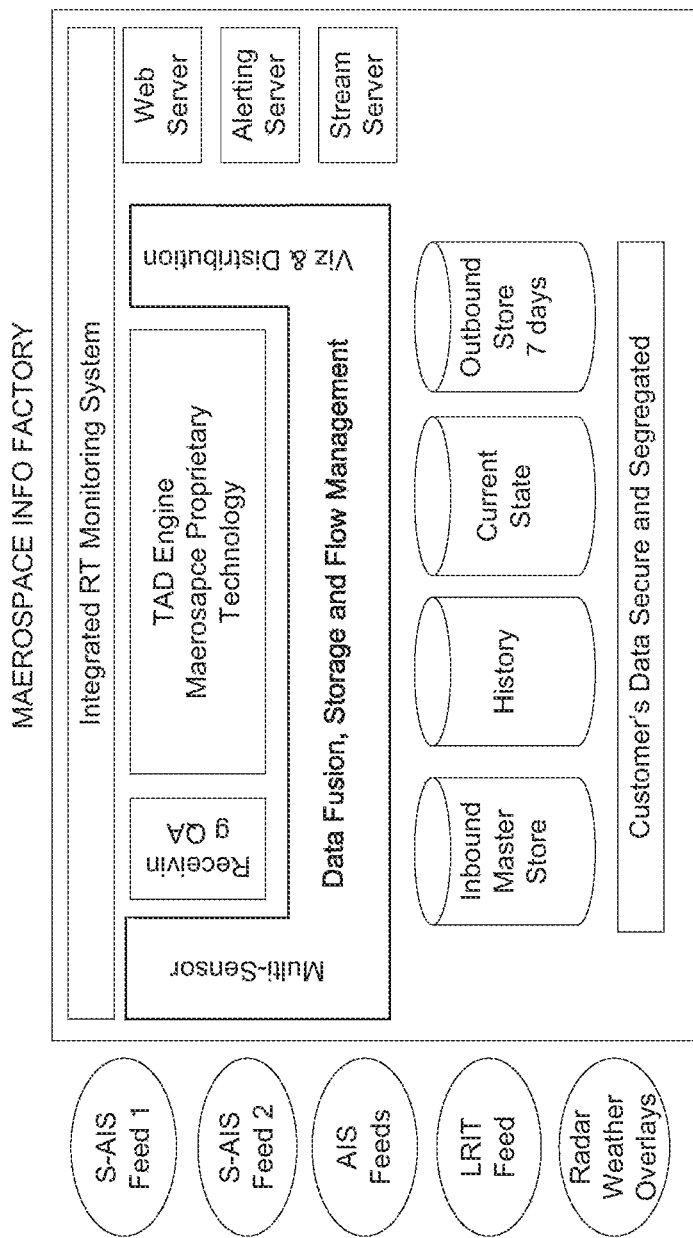
FIG. 1 shows a schematic block diagram of a system architecture in accordance with an illustrative embodiment.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

As noted above, the present invention relates to a system and method for tracking and forecasting the positions of marine vessels.

The present system and method is adapted to execute a forecasting algorithm to forecast the position of a marine vessel based on one or more satellite AIS (S-AIS) signals received from the vessel.

In an embodiment, the forecasting algorithm utilizes location and direction information for the vessel derived from Coastal and Satellite AIS, LRIT (Long Range Identification and Tracking—a different ship position reporting system also mandated by the International Maritime Organization) or other sources, and estimates one or more possible headings based on previous paths taken by vessels from that location, and heading in that direction.

In an embodiment, a body of water is divided into "bins" of location and direction information, and a spatial index is built based on the paths taken by previous vessels in each of the bins. The location and direction information for the vessel is added to the bin and updated. Other types of information may also be taken into account that represent potential influences on the likely future path of the vessel, including ship type, weather, ocean currents, the time of year, and other variables specific to that bin or vessel.

By building clean ship tracks and then re-indexing these tracks by position/heading bins rather than time (raw position data) or Ship Identifier (typically MMSI, a ship identification number used by AIS systems), the system can quickly build a probability cloud to represent the current and future position of any vessel from a recent S-AIS message. Such an estimate may also include a dead reckoning estimate for bins with no prior history.

The system is also adapted to generate a dynamic probability cloud starting at the time of the most recently received position message, and which grows for a given period of time afterwards. Advantageously, the probability cloud identifies one or more regions of probability in which a vessel is located. The probability cloud may also utilize colors to indicate which areas in the cloud are most likely to include the vessel.

An illustrative embodiment of the system and method will now be described with reference to FIGS. 1 to 6.

FIG. 1 shows a schematic block diagram of a system architecture in accordance with an illustrative embodiment.

Figure 2:
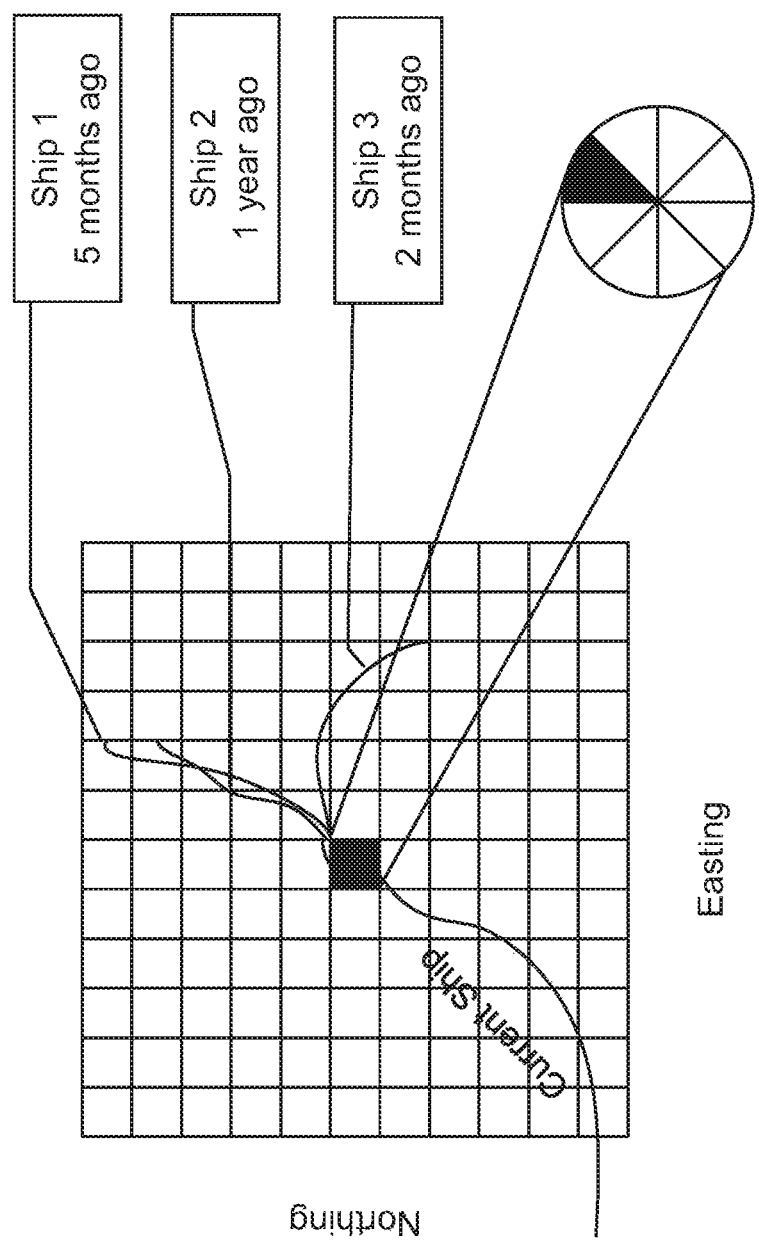
FIG. 2 shows a schematic diagram of marine vessel positions shown on a map based on satellite automatic identification system (S-AIS) data for a vessel.

FIG. 2 shows a schematic diagram of marine vessel positions shown on a map based on satellite automatic identification system (S-AIS) data received for a vessel. As shown, a body of water is divided into substantially rectilinear areas represented in this example as squares in a grid. Of course, taking into account the curvature of the earth, these substantially rectilinear areas may be defined by lines of latitude and longitude, such that their shape and size of these substantially rectilinear areas may vary depending on their distance from the equator, and the resolution chosen. However, for the purposes of the present illustration, it is assumed that each bin is approximately square.

In this illustrative embodiment, each square represents a "bin" in which location and direction information for vessels passing through that square is indexed. Each bin contains such information for each of a number of different directions, such that the location and direction information is spatially indexed for every direction.

In an embodiment, the system and method is adapted to utilize the spatially indexed location and direction information to ask "What did previous ships, at this same location/direction, do next?" Answering this question based on a probability model results a probability cloud which can indicate one or more likely locations of a vessel over time. Advantageously, calculating the prior behaviour of vessels and indexing as described enable material improvements in the speed with which forecasts for one or more ships may be obtained, and makes the near real-time tracking of hundreds of thousands of ships possible.

Figure 3:
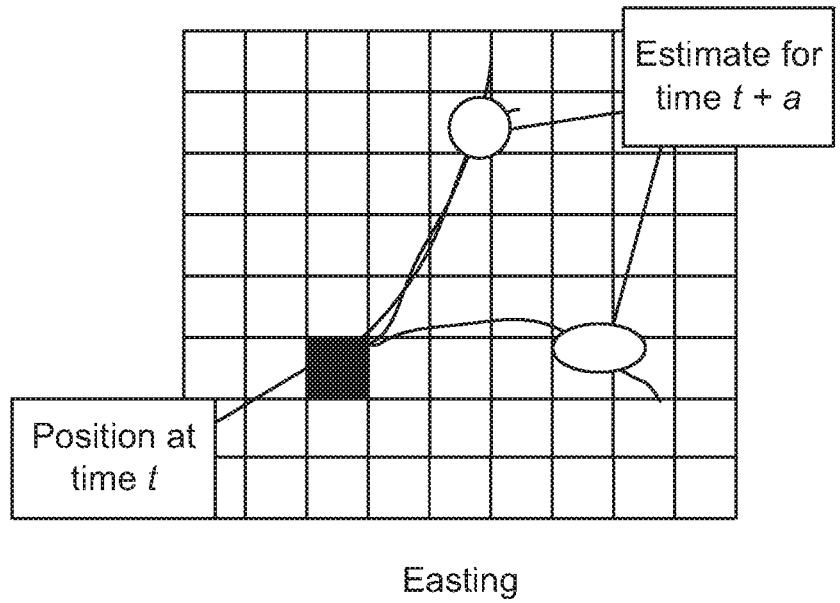
FIG. 3 shows a schematic diagram illustrating forecasting a current location of a vessel based on previously received S-AIS data for a vessel.

FIG. 3 shows a schematic diagram illustrating forecasting a current location of a vessel based on previously received position, identity course and speed data (such as from AIS) for a vessel. By building clean ship tracks and then re-indexing these tracks by position/heading bins rather than time (e.g. raw AIS) or MMSI (a ship track) one can quickly build a probability cloud to represent the current and future position of a ship from a recent S-AIS message. Such an estimate may include a dead reckoning estimate for regions with no history.

In an embodiment, the system is adapted to track, forecast, and detect anomalies in a vessel's reported and predicted positions. For this purpose, the system may utilize a data fusion algorithm in which the system receives AIS, Satellite-AIS and/or other position reporting feeds from any source. This data may contain comment elements (e.g. AIS message fields for identity, position, etc.) as well as some data that is unique to the supplier of the data stream (e.g. Timestamps, metatags, etc.).

In an embodiment, this data is fused by the following algorithm:

1) Store exact copy of received data in sequence
2) Quality Check comprising:
   a. Data format consistent with requirements.
   b. Doppelganger (two ships transmitting the same vessel identity) check against list of known Doppelgangers. Tag is added to messages to enable distinction between targets with the same MMSI later in the process.
3) Converting from time domain (one data record for each message stored in sequence) to MMSI domain with the messages stored as a track history indexed and stored in time sequence for each MMSI.

The system is also adapted to utilize one or more forecasting algorithms, including the following:

1) Initial Prediction Algorithm (IPA). This algorithm receives a message, determines its validity based on a set of configuration parameters. The algorithm can filter the message, pass it on to the distribution engine without further processing and/or store it as an input for the prediction algorithm. The IPA uses the most recent two ship position reports and forecast a new position based on the elapsed time since the last report and the prior positions and speed data. The result of this prediction is compared against a bathymetry database and, if the position would place the ship in an invalid position, then creates a new predicted position in a valid location on the water.

2) Secondary Prediction Algorithms (SPA) also receive and validate the received data. A separate process periodically analyzes all available ship track histories to create a database of the typical behavior of ships in a given state (e.g. position and direction) for each small geospatial region of the world. This behaviour is represented by a list of the most likely 2-D spatial offset locations, indexed by 'distance travelled'. Point calculations will be stored for a given distance limit (say, 500 nautical miles) into both the future and the past for any ships last observed in each specific region. Different 'point databases' can be maintained for ships of a given class, stated destination, size, etc., and separate databases or tables may also be used for different seasons. An online, near-real-time process updates the position of every ship in the global database by using its most recent reported position, heading, ship class, speed, and other state variables as an index to query one or more of the point databases described above. Using this system, a set of predicted current and future positions for every ship is then computed from the past local behavior. The current and future state of the ship is stored in a separate state database.

3) Region of Probability generator software will, on demand or periodically, generate a geospatial region of probability of target's location for a specified point in time (present, past, or future). This region will be configurable to represent different levels of confidence in the location (e.g. 90% probability that the target is within the region). The region will be computed, stored and available for delivery as data elements to any compatible display system.

4) Multiple ships can report the same station identifier (typically, but not always, the MMSI number), although this is not the intended use of AIS. Such duplicated identifiers are referred to as Doppelgangers. When these reports are detected, they can be compared with the positional probabilities described earlier, in order to produce probabilities that the report is associated with any previous vessel that also reported the same MMSI identifier. If no existing vessel can be associated with the incoming message, then a new Doppelganger code is assigned to the current message for future comparisons and reference. This method is referred to as Doppelganger disambiguation.

5) Additional data inputs (e.g. weather or wave data) may be incorporated into the prediction algorithm to obtain more accurate forecasts.

Anomaly Definitions

In another aspect, the system and method is adapted to evolve a list of anomalies associated with AIS messages and ship behaviour as shown in Schedule 1, below. These anomalies fit one of two classes: intrinsic and behavioural (a.k.a. contextual).

| Item | Anomaly Description |
|---|---|
| 1. | DOPPLERGANGER |
| | One or more other ships have been detected using this ship identifier (e.g. MMSI) |
| 2. | Invalid MMSI |
| | Received MMSI number does not conform to AIS standards |
| 3. | SHIP IS DRIFTING |
| | Ship heading is excessively different from its course over ground |
| 4. | BAD COG |
| | The reported Course Over Ground value is outside of range 0-359 |
| 5. | BAD HEADING |
| | The reported Heading value is outside of range 0-359 |
| 6. | BAD ACCELERATION |
| | The reported Acceleration is unrealistic (outside of pre-defined range) |
| 7. | BAD SOG |
| | The reported Speed Over Ground is unrealistic (outside of a pre-defined range) |
| 8. | BAD SHIP TYPE |
| | The reported ship Type (e.g. Cargo, Tanker, etc.) is invalid by ITU standards |
| 9. | BAD DIMENSION |
| | Reported Ship dimension do not match pre-defined values for that ship |
| 10. | NAME CHANGE |
| | Reported Ship Name has changed from previously reported names |
| 11. | NEW SHIP |
| | The reported MMSI has not been previously detected in the area of interest |
| 12. | NEW IMO |
| | The reported IMO (International Maritime Organization number - a unique identifier assigned to vessels) has not been previous detected in the Area of Interest |
| 13. | MISSING SHIP |
| | The ship has not been detected for a period of time that exceeds a predetermined bvalue for that ship |
| 14. | MMSI FOUND |
| | A ship previously reported as MISSING has been detected |

| Item | Anomaly Description |
|---|---|
| 15. | INVALID MESSAGE TYPE |
| | The reported message type is outside of the range as defined in the AIS standard |
| 16. | EXCESSIVE MESSAGE LENGTH |
| | Message length is outside of the allowed length as defined in the AIS standard |
| 17. | INVALID MMSI FORMAT |
| | MMSI format (i.e. nine numeric characters) is invalid as defined in the AIS standard |
| 18. | INVALID IMO FORMAT |
| | IMO number format is invalid as defined in the AIS standard |
| 19. | INVALID CALL SIGN |
| | Call Sign format is invalid as defined in the AIS standard |
| 20. | UNASSIGNED IMO |
| | The IMO number does not exist in a predefined list of IMO numbers in use |
| 21. | UNLISTED MMSI |
| | MMSI does not exist in a predefined list of MMSI numbers |
| 22. | IMO-MMSI MISMATCH |
| | The IMO number was associated previously with a different MMSI |
| 23. | SHIP STALLED OR GROUNDED |
| | Speed over Ground is zero away from normal anchorage or port region |
| 24. | EXCESSIVE SOG |
| | Speed Over Ground exceeds maximum limit for that ship or ship class |
| 25. | SHIP ON LAND |
| | Reported ship positions is not on water |
| 26. | INVALID LAT/LON |
| | Is not on plant. Latitude or Longitude is outside of range 0-360. Special Case: Lat/Lon of 91/181 indicates disabled GPS input to AIS transceiver |
| 27. | RENDEZVOUS/COLLISION |
| | Predicted or current position shows two or more ships exceeding predefined proximity limits |
| 28. | EXCESSIVE MOVEMENT |
| | Change from previous position message is outside predefined limits |
| 29. | CUTTING CORNER |
| | Predicted position outside of route usually followed by vessels and distance to shore is closer than predefined limits |
| 30. | CHANGE OF COURSE |
| | Reported position outside of expected path beyond limits defined for that vessel |
| 31. | UNNECESSARY DETOUR |
| | Vessel takes route longer by x nautical miles than a usual route |
| 32. | INVALID CHANGE OF DIRECTION |
| | Course Over Ground change from previous position report exceeds predefined limits |
| 33. | OUT OF DATE DESTINATION |
| | Reported Destination did not change after departing reported destination |
| 34. | Additional anomalies may be added from time to time |

Anomaly tagging specifications—In an embodiment, the system may include a standard for tagging AIS messages with these anomalies. Forecasted messages may be tagged with these anomalies. The tags can then be used by display and alerting software as well as analytic software downstream of the forecasting algorithms.

Anomaly detection and alerting methods—In an embodiment, the system is adapted to detect anomalies (e.g. a position report inside a user-defined geo-fence) in both forecasted AIS messages and AIS messages.

Message Generation specifications and software—The AIS message specification (NMEA standard) and other standard tracking protocols allow for proprietary data to be embedded in AIS messages.

In an embodiment, the system and method retrieves the desired state information (e.g. forecasted position) of ships from its database periodically and constructs NMEA and AIS-standards compliant messages comprising an appropriately typed AIS message with anomaly metadata embedded according to the system standard. These messages are then passed to another system for display, streaming and alerting. Such display systems will accept and display the standard NMEA and AIS message components and will ignore proprietary metadata unless programmed to recognize the anomaly tags defined by the present invention, thus ensuring compatibility with existing display systems.

Forecasting Implementation

Each of the forecasting algorithms above may be implemented to perform the following functions:

Receiving

1) Receive and store all data for a customer-specific period of time (e.g. 12 months).
2) Doppelganger detection and recoding as required for forecasting.
3) Tagging of received messages with intrinsic anomalies (this function may be performed at later stages in some implementations).
4) Indexing and reorganizing of data as required for Forecasting algorithms.

Forecasting

5) Update and maintain a current state database (including, but not limited to, ID, position, heading speed and course) for a minimum capacity of 200,000 distinct MMSIs not less than once every ten minutes.
6) Update and maintain a similar state database for each of the next number of desired time periods (typically 4 hours) not less than once every 10 minutes.
7) Ability to limit outputs to a pre-defined list of ships.
8) Ability to distinguish between doppelgangers and to track them separately.
9) Ability to incorporate contextual information from other data sources (e.g. weather, navigation channels, etc.) into the database and the dynamic assessment of the present and future ship positions.

10) Ability to maintain a history of forecasting accuracy for each ship by comparing new positions received with the prior forecasts, calculating meaningful statistics and storing this information for each ship. The per-ship tracking of these statistics is essential due to wide range of possible values which renders globally computed statistics useless.

11) Ability to maintain a history of the timing of received data from the ship in order to detect unexpected failure of transmission or reception of signals. The time since last message is computed upon receipt. This time difference is then used to calculate the meaningful performance statistics of data reception and storing this information for each ship. The per-ship tracking of these statistics is essential due to wide range of possible values which renders globally computed statistics useless.

Anomaly Detection and Alerting

12) Detect and tag some or all of the anomalies as shown in Schedule 1 (additional anomalies may be added as they are discovered and tested).
13) Provide an interface to enable the system to generate user alerts on all detected anomalies.
14) Pass data (in a real-time stream, batch delivery on upon request by the downstream software) to a software tool for proper visualization of tracks on a map up to current or future forecasted position.

Visualization

15) Deliver data and related metadata to a software tool to visualize regions of probabilities within the software.

Monitoring and Logging

16) Implement visualization tool for monitoring real-time status of the flow of data from receipt of raw data to delivery of data to outside systems.
17) Implement monitoring tool running outside of the primary data center to detect data flow and volume to each customer and to generate email and visual alert if output falls below a defined volume for more than a defined period of time (typically 25 minutes).

Verification

18) Per ship and group technical comparison showing performance of each algorithm versus dead reckoning, time between detections and anomalies detected.

Visualization

Existing software solutions may provide for certain platform capabilities to aid in the visualization of vessel location, data management, alerting, tracking and other features inherent to the forecasting service.

Figure 4A:
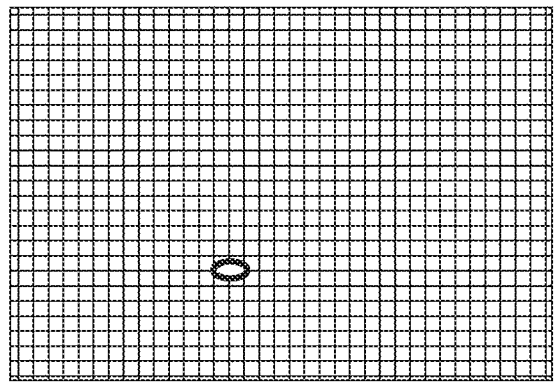
FIGS. 4A to 4C show illustrative examples of a probability cloud indicating one or more areas identified as being likely to include the vessel at three different points in time.
Figure 4B:
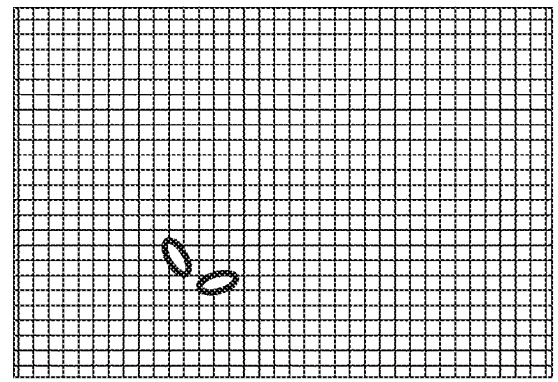
Figure 4C:
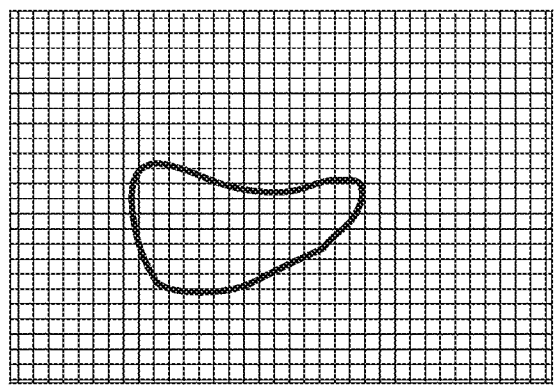

FIGS. 4A to 4C show illustrative examples of a probability cloud indicating one or more areas identified as being likely to include the vessel at three different points in time. Having a probability cloud for both the current and future position of a ship can express relative levels of 'quality' for a position report which can be used to prioritize search areas during vessel interdiction or search efforts. Furthermore, increasing uncertainty with time corresponds to a widening cloud of probability, until eventually the cloud becomes uninformative, depending on the user's needs.

In an embodiment, spatial indexing provides various advantages, including the ability to observe trends in a region over seasons and years.

Fishing and natural resource evolution
Changes in container traffic
Fast answer to "Who has been here, and when?"
Ability to detect co-incident anomalous behavior of multiple vessels
Ability to maintain multiple predictions for hundreds of thousands of vessels with very short update intervals.
Ability to optimize use of surface and air assets in searching or interdicting a target vessel
Ability to more quickly and accurately detect anomalies in reported positions in order to detect threats, suspicious behavior, ships in distress or unreported changes in direction.
Ability to detect when a ship may have ceased transmissions by noting statistically meaningful time since last received.
Ability to detect unexpected positions more quickly than with other methods because the expected state of each ship is stored by the algorithm and is immediately available without further computation.

Figure 5:
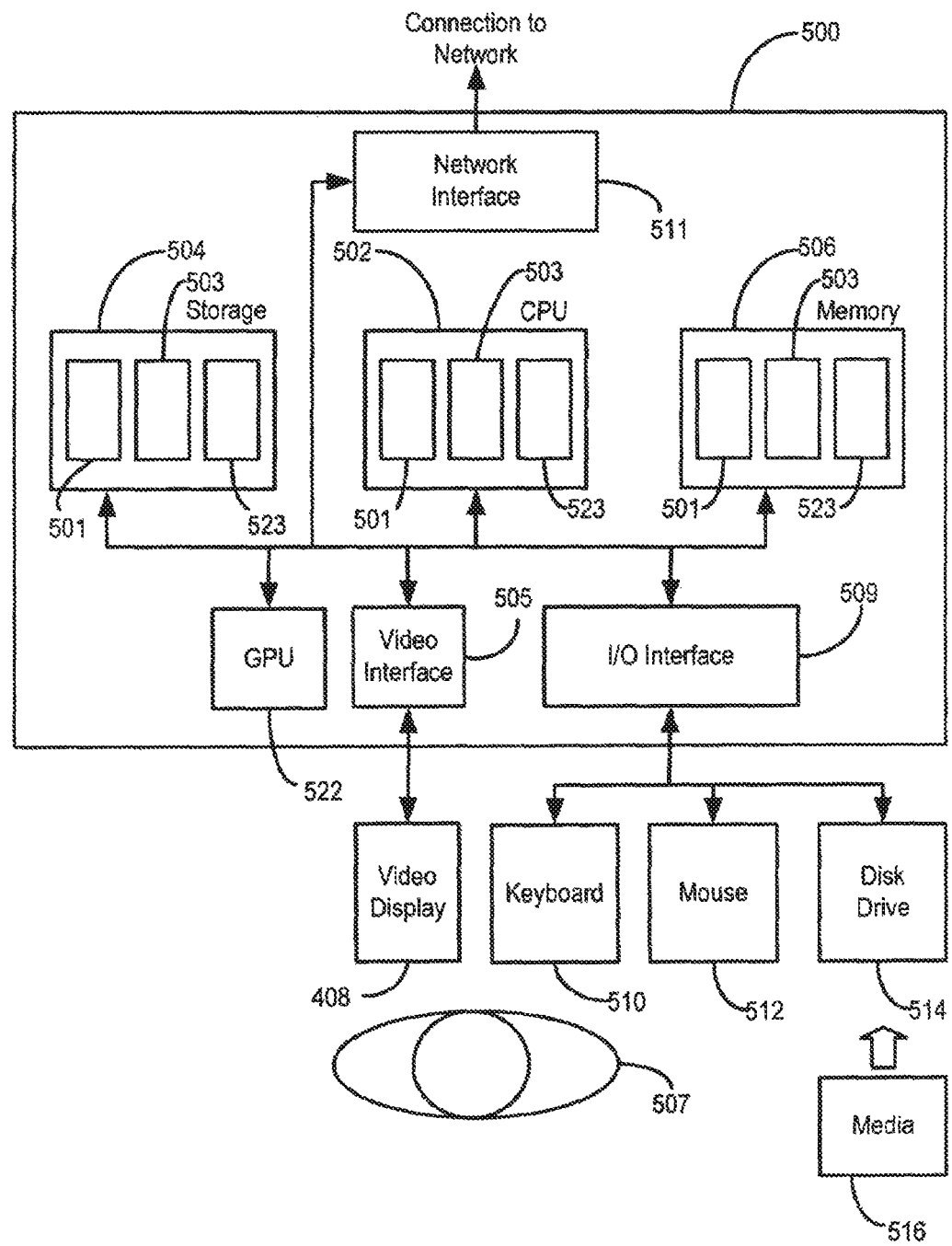
FIG. 5 shows a schematic block diagram of a generic computing device which may provide an operating embodiment in one or more embodiments.

FIG. 5 shows a schematic block diagram of a generic computing device which may provide an operating embodiment in one or more embodiments. A suitably configured computer device, and associated communications networks, devices, software and firmware may provide a platform for enabling one or more embodiments as described above. By way of example, FIG. 5 shows a generic computer device 500 that may include a central processing unit ("CPU") 502 connected to a storage unit 504 and to a random access memory 506. The CPU 502 may process an operating system 501, application program 503, and data 523. The operating system 501, application program 503, and data 523 may be stored in storage unit 504 and loaded into memory 506, as may be required. Computer device 500 may further include a graphics processing unit (GPU) 522 which is operatively connected to CPU 502 and to memory. An operator 507 may interact with the computer device 500 using a video display 508 connected by a video interface 505, and various input/output devices such as a keyboard 510, pointer 512, and storage 514 connected by an I/O interface 509. In known manner, the pointer 512 may be configured to control movement of a cursor or pointer icon in the video display 508, and to operate various graphical user interface (GUI) controls appearing in the video display 508. The computer device 500 may form part of a network via a network interface 511, allowing the computer device 500 to communicate with other suitably configured data processing.

Thus, in an aspect, there is provided a computer-implemented system for forecasting the position of a marine vessel based on one or more position reports, the system adapted to: provide, for a body of water, a spatial index comprising a plurality of bins, each bin containing location and direction information specific to each bin; obtain one or more position reports for a vessel comprising position and direction information; determine one or more bins the vessel has travelled through, and execute a forecasting algorithm based on the spatial index and the location and direction information specific to the one or more bins through which the vessel has travelled.

In an embodiment, the system is further adapted to: obtain contextual data about a surrounding ocean state; obtain current dynamic contextual information relating to the state of the vessel and the surrounding ocean state corresponding to the information related to each bin; and execute a forecasting algorithm based on the spatial index, the location and direction information specific to the one or more bins through which the vessel has travelled, and the comparison of contextual information stored in one or more bins with that of the current dynamic situation of the vessel and the surrounding ocean state.

In another embodiment, the system is further adapted to detect an unexpected position of a marine vessel based on a comparison of each new position report combined with a stored history of the statistical accuracy of the forecasting algorithms for that specific vessel by computing and updating the statistical accuracy of recent forecasts upon receipt of each new position report.

In another embodiment, the statistical accuracy includes a measure of a median absolute deviation.

In another embodiment, the system is further adapted to store a per-vessel statistical forecasting accuracy for each vessel.

In another embodiment, the system is further adapted to compare each new position report with the statistical forecasting accuracy for that vessel and determines if the new position is sufficiently different from the expected position that it exceeds a predefined threshold constituting an anomalous position.

In another embodiment, the system is further adapted to: detect an unexpected failure to receive a position report from a marine vessel based on a comparison of the time since the previous position report with a stored history of the statistical periodicity of message receipt for that specific vessel.

In another embodiment, the system is further adapted to update the statistical accuracy of the time between receipt of position reports upon receipt of each new position report.

In another embodiment, the system is further adapted to: compare the time since the prior position report with the statistical time periodicity of message receipt for that vessel; and determine if the new time difference is sufficiently different from the expected time that it exceeds a predefined threshold constituting an anomalous position.

In another embodiment, the system is further adapted to: monitor the time since receipt of the message for one or more ships; and compare the elapsed time to the stored statistical periodicity of message receipt for that vessel and determines if the elapsed time is sufficiently different from the expected time that it exceeds a predefined threshold constituting an anomalous position.

In another aspect, there is provided a computer-implemented method for forecasting the position of a marine vessel based on one or more position reports, comprising: providing for a body of water a spatial index comprising a plurality of bins, each bin containing location and direction information specific to each bin; obtaining one or more position reports for a vessel comprising position and a direction information; determining one or more bins the vessel has travelled through, and executing a forecasting algorithm based on the spatial index and the location and direction information specific to the one or more bins through which the vessel has travelled.

In an embodiment, the method further comprises: obtaining contextual data about a surrounding ocean state; obtaining current dynamic contextual information relating to the state of the vessel and the surrounding ocean state corresponding to the information related to each bin; and executing a forecasting algorithm based on the spatial index, the location and direction information specific to the one or more bins through which the vessel has travelled, and the comparison of contextual information stored in one or more bins with that of the current dynamic situation of the vessel and the surrounding ocean state.

In another embodiment, the method further comprises: detecting an unexpected position of a marine vessel based on a comparison of each new position report combined with a stored history of the statistical accuracy of the forecasting algorithms for that specific vessel by computing and updating the statistical accuracy of recent forecasts upon receipt of each new position report.

In another embodiment, the statistical accuracy includes a measure of a median absolute deviation.

In another embodiment, the method further comprises: storing a per-vessel statistical forecasting accuracy for each vessel.

In another embodiment, the method further comprises: comparing each new position report with the statistical forecasting accuracy for that vessel; and determining if the new position is sufficiently different from the expected position that it exceeds a predefined threshold constituting an anomalous position.

In another embodiment, the method further comprises: detecting an unexpected failure to receive a position report from a marine vessel based on a comparison of the time since the previous position report with a stored history of the statistical periodicity of message receipt for that specific vessel.

In another embodiment, the method further comprises: updating the statistical accuracy of the time between receipt of position reports upon receipt of each new position report.

In another embodiment, the method further comprises: comparing the time since the prior position report with the statistical time periodicity of message receipt for that vessel; and determining if the new time difference is sufficiently different from the expected time that it exceeds a predefined threshold constituting an anomalous position.

In another embodiment, the method further comprises: monitoring the time since receipt of the message for one or more ships; and comparing the elapsed time to the stored statistical periodicity of message receipt for that vessel and determines if the elapsed time is sufficiently different from the expected time that it exceeds a predefined threshold constituting an anomalous position.

Figure 6:
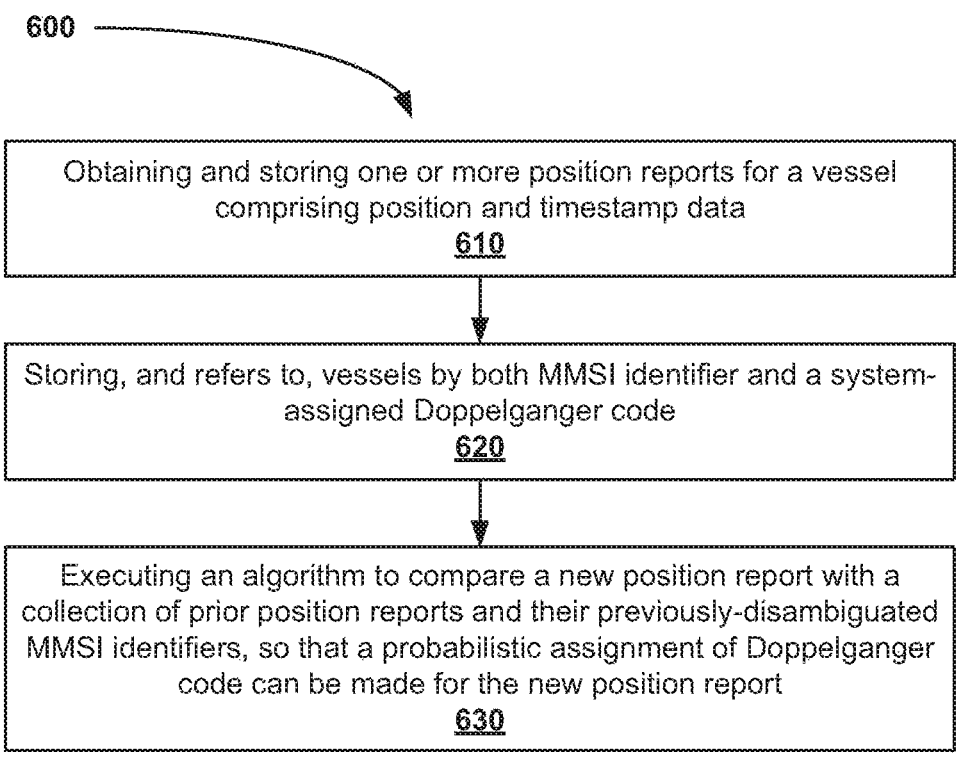
FIG. 6 shows a flowchart of an example of a computer-implemented method for disambiguating Automatic Identification System (AIS) transmissions from different vessels using the same Maritime Mobile Service Identity (MMSI) identifier.

In another aspect, as shown in FIG. 6, there is provided a computer-implemented method 600 for disambiguating AIS transmissions from different vessels using the same MMSI identifier, comprising: obtaining and storing 610 one or more position reports for a vessel comprising position and timestamp data; storing 620, and refers to, vessels by both MMSI identifier and a system-assigned Doppelganger code, and; executing 630 an algorithm to compare a new position report with a collection of prior position reports and their previously-disambiguated MMSI identifiers, so that a probabilistic assignment of Doppelganger code can be made for the new position report.

While illustrative embodiments have been described above by way of example, it will be appreciated that various changes and modifications may be made without departing from the scope of the invention, which is defined by the following claims.

What is claimed is:
1. A computer-implemented system for forecasting the position of a marine vessel based on one or more position reports, the system comprising:
   at least one processor; and
   a memory comprising instructions which when executed by the at least one processor configure the at least one processor to:
   provide, fora body of water, a spatial index comprising a plurality of bins, each bin containing location and direction information specific to each bin for each of a number of different directions such that the location and direction information specific to each bin is spatially indexed for each of the number of different directions;

store, in the memory, one or more temporal position reports for a vessel comprising position and direction information, wherein the one or more temporal position reports are received from one or more sensors of a transponder system of the vessel;

determine one or more bins the vessel has travelled through by re-indexing the temporal position reports for the vessel using the spatial index comprising the plurality of bins, and forecast a position of the vessel based on the spatial index and the location and direction information specific to the one or more bins through which the vessel has travelled by estimating one or more possible headings based on previous paths from the location in a substantially same direction as the vessel.

2. The computer-implemented system of claim 1, wherein the at least one processor is further configured to:

obtain contextual data about a surrounding ocean state;

obtain current dynamic contextual information relating to the state of the vessel and the surrounding ocean state corresponding to the information related to each bin; and forecast the position of the vessel based on the spatial index, the location and direction information specific to the one or more bins through which the vessel has travelled, and the comparison of contextual information stored in one or more bins with that of the current dynamic situation of the vessel and the surrounding ocean state.

3. The computer-implemented system of claim 1, wherein the at least one processor is further configured to detect an unexpected position of a marine vessel based on a comparison of each new position report combined with a stored history of the statistical accuracy of the forecasted expected position of the specific vessel by computing and updating the statistical accuracy of recent forecasts upon receipt of each new position report.

4. The computer-implemented system of claim 3, wherein the statistical accuracy includes a measure of a median absolute deviation.

5. The computer-implemented system of claim 3, wherein the at least one processor is further configured to store a per-vessel statistical forecasting accuracy for each vessel.

6. The computer-implemented system of claim 5, wherein the at least one processor is further configured to compare each new position report with the statistical forecasting accuracy for that vessel and determines if the new position is sufficiently different from the expected position that it exceeds a predefined threshold constituting an anomalous position.

7. The computer-implemented system of claim 1, wherein the at least one processor is further configured to:

detect an unexpected failure to receive a position report from a marine vessel based on a comparison of the time since the previous position report with a stored history of the statistical periodicity of message receipt for that specific vessel.

8. The computer-implemented system of claim 7, wherein the at least one processor is further configured to update the statistical accuracy of the time between receipt of position reports upon receipt of each new position report.

9. The computer-implemented system of claim 8, wherein the at least one processor is further configured to:

compare the time since the prior position report with the statistical time periodicity of message receipt for that vessel; and determine if the new time difference is sufficiently different from the expected time that it exceeds a predefined threshold constituting an anomalous position.

10. The computer-implemented system of claim 9, wherein the at least one processor is further configured to:

monitor the time since receipt of the message for one or more ships; and compare the elapsed time to the stored statistical periodicity of message receipt for that vessel and determines if the elapsed time is sufficiently different from the expected time that it exceeds a predefined threshold constituting an anomalous position.

11. A computer-implemented method for forecasting the position of a marine vessel based on one or more position reports, comprising:

providing for a body of water a spatial index comprising a plurality of bins, each bin containing location and direction information specific to each bin for each of a number of different directions such that the location and direction information specific to each bin is spatially indexed for each of the number of different directions;

storing, at a repository of a marine vessel tracking system, one or more temporal position reports for a vessel comprising position and a direction information, wherein the one or more temporal position reports are received from one or more sensors of a transponder system of the vessel;

determining one or more bins the vessel has travelled through by re-indexing the temporal position reports for the vessel using the spatial index comprising the plurality of bins, and forecasting a position of the vessel based on the spatial index and the location and direction information specific to the one or more bins through which the vessel has travelled by estimating one or more possible headings based on previous paths from the location in a substantially same direction as the vessel.

12. The computer-implemented method of claim 11, further comprising:

obtaining contextual data about a surrounding ocean state;

obtaining current dynamic contextual information relating to the state of the vessel and the surrounding ocean state corresponding to the information related to each bin; and forecasting the position of the vessel based on the spatial index, the location and direction information specific to the one or more bins through which the vessel has travelled, and the comparison of contextual information stored in one or more bins with that of the current dynamic situation of the vessel and the surrounding ocean state.

13. The computer-implemented method of claim 11, further comprising:

detecting an unexpected position of a marine vessel based on a comparison of each new position report combined with a stored history of the statistical accuracy of the forecasting algorithms for that specific vessel by computing and updating the statistical accuracy of recent forecasts upon receipt of each new position report.

14. The computer-implemented method of claim 13, wherein the statistical accuracy includes a measure of a median absolute deviation.

15. The computer-implemented method of claim 13, further comprising storing a per-vessel statistical forecasting accuracy for each vessel.

16. The computer-implemented method of claim 15, further comprising:
   comparing each new position report with the statistical forecasting accuracy for that vessel; and
   determining if the new position is sufficiently different from the expected position that it exceeds a predefined threshold constituting an anomalous position.

17. The computer-implemented method of claim 11, further comprising detecting an unexpected failure to receive a position report from a marine vessel based on a comparison of the time since the previous position report with a stored history of the statistical periodicity of message receipt for that specific vessel.

18. The computer-implemented method of claim 17, further comprising updating the statistical accuracy of the time between receipt of position reports upon receipt of each new position report.

19. The computer-implemented method of claim 18, further comprising:
   comparing the time since the prior position report with the statistical time periodicity of message receipt for that vessel; and
   determining if the new time difference is sufficiently different from the expected time that it exceeds a predefined threshold constituting an anomalous position.

20. The computer-implemented method of claim 19, further comprising:
   monitoring the time since receipt of the message for one or more ships; and
   comparing the elapsed time to the stored statistical periodicity of message receipt for that vessel and determines if the elapsed time is sufficiently different from the expected time that it exceeds a predefined threshold constituting an anomalous position.

21. The system of claim 1, wherein the at least one processor is further to generate a visualization of the forecasted position of the vessel and transmit the visualization to a display device to display the forecasted position of the vessel.

22. The computer-implemented method of claim 11, further comprising displaying a visualization of the forecasted position of the vessel at a display device.

* * * * *